(12) United States Patent
Chen et al.

(10) Patent No.: US 12,393,290 B1
(45) Date of Patent: Aug. 19, 2025

(54) FULL-AREA TOUCH DEVICE

(71) Applicant: SUNREX TECHOLOGY CORP., Taichung (TW)

(72) Inventors: Chun-Chieh Chen, Taichung (TW); Yi-Wen Tsai, Taichung (TW)

(73) Assignee: SUNREX TECHOLOGY CORP., Taichung (TW)

( * ) Notice: Subject to any disclaimer, the term of this patent is extended or adjusted under 35 U.S.C. 154(b) by 0 days.

(21) Appl. No.: 18/791,819

(22) Filed: Aug. 1, 2024

(30) Foreign Application Priority Data

May 3, 2024 (TW) .................................. 113116584

(51) Int. Cl.
*G06F 3/0354* (2013.01)
(52) U.S. Cl.
CPC ............... *G06F 3/03547* (2013.01); *G06F 2203/04105* (2013.01)
(58) Field of Classification Search
CPC ............... G06F 3/03547; G06F 2203/04105
See application file for complete search history.

(56) References Cited

U.S. PATENT DOCUMENTS

| | | | |
|---|---|---|---|
| 11,372,457 B1 * | 6/2022 | Lee ...................... | G06F 3/03547 |
| 11,941,190 B1 * | 3/2024 | Chu ...................... | G06F 1/1643 |
| 12,242,677 B1 * | 3/2025 | Chen ................... | G06F 3/03547 |
| 2022/0113819 A1 * | 4/2022 | Li ........................ | G06F 1/169 |

* cited by examiner

*Primary Examiner* — Julie Anne Watko
(74) *Attorney, Agent, or Firm* — Thomas | Horstemeyer, LLP

(57) ABSTRACT

A full-area touch device includes a base plate and a trigger member mounted on the base plate. A touch unit is disposed over the base plate and includes a trigger switch aligned with the trigger member. An outer frame is connected to the touch unit. An inner frame is surrounded by the outer frame, and surrounds the base plate. A first linkage subunit is connected to a bottom surface of the outer frame and a top surface of the inner frame. A second linkage subunit is connected to the inner frame and the base plate, and includes front-rear linkage members surrounding the trigger member. Two third linkage subunits are fixedly connected to the inner frame. The inner frame, the first linkage subunit, the second linkage subunit, the third linkage subunits, and the outer frame push the touch unit away from the base plate.

8 Claims, 9 Drawing Sheets

FULL-AREA TOUCH DEVICE

CROSS-REFERENCE TO RELATED APPLICATION

This application claims priority to Taiwanese Invention Patent Application No. 113116584, filed on May 3, 2024, the entire disclosure of which is incorporated by reference herein.

FIELD

The disclosure relates to a touch device, and more particularly to a full-area touch device.

BACKGROUND

A laptop computer is configured to have a touchpad to assist a mouse.

An existing touchpad includes a base plate, a touch plate disposed above the base plate, and a trigger switch disposed between the base plate and the touch plate. The touch plate has a pivotal side pivoted to the base plate, and a swing side opposite to the pivotal side.

When a portion of the touch plate adjacent to the swing side is pressed, the touch plate is pivotally rotated about the pivotal side that serves as an axis to trigger the trigger switch. However, when the pivotal side or a portion of the touch plate adjacent to the pivotal side is pressed, the touch plate may be unlikely to move, so that a trigger region of the existing touchpad is caused to be limited.

SUMMARY

Therefore, an object of the disclosure is to provide a full-area touch device that can alleviate at least one of the drawbacks of the prior art.

According to the disclosure, the full-area touch device includes a base unit, a touch unit, and a linkage unit.

The base unit includes a base plate, and a trigger member that is mounted on the base plate.

The touch unit is disposed over the base unit, and includes a touch plate, a circuit board, and a trigger switch. The circuit board is disposed on a bottom surface of the touch plate, and has a bottom surface opposite to the touch plate. The trigger switch is disposed on the bottom surface of the circuit board, is aligned with the trigger member, and is configured to be triggered by the trigger member.

The linkage unit is disposed between the base unit and the touch unit, is symmetrical with respect to the trigger switch in a front-rear direction and a left-right direction that is perpendicular to the front-rear direction, and includes an outer frame, an inner frame, a first linkage subunit, a second linkage subunit, and two third linkage subunits. The outer frame is fixedly connected to the bottom surface of the circuit board. The inner frame is surrounded by the outer frame, is disposed below the circuit board, is flexible, and includes a left inner frame plate and a right inner frame plate spaced apart from the left inner frame plate. The left inner frame plate and the right inner frame plate cooperatively surround the base plate. The first linkage subunit is fixedly connected to a bottom surface of the outer frame and a top surface of the inner frame, and includes a left linkage plate and a right linkage plate spaced apart from the left linkage plate. The left linkage plate and the right linkage plate are flexible. The second linkage subunit is fixedly connected to the top surface of the inner frame and a top surface of the base plate, and includes a plurality of front-rear linkage members spaced apart from each other, cooperatively surrounding the trigger member, and flexible. Each of the third linkage subunits includes a left-right linkage member that is flexible and that is fixedly connected to a top surface of the left inner frame plate and a top surface of the right inner frame plate.

The inner frame, the first linkage subunit, the second linkage subunit, the third linkage subunits, and the outer frame cooperatively push the circuit board away from the base plate.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
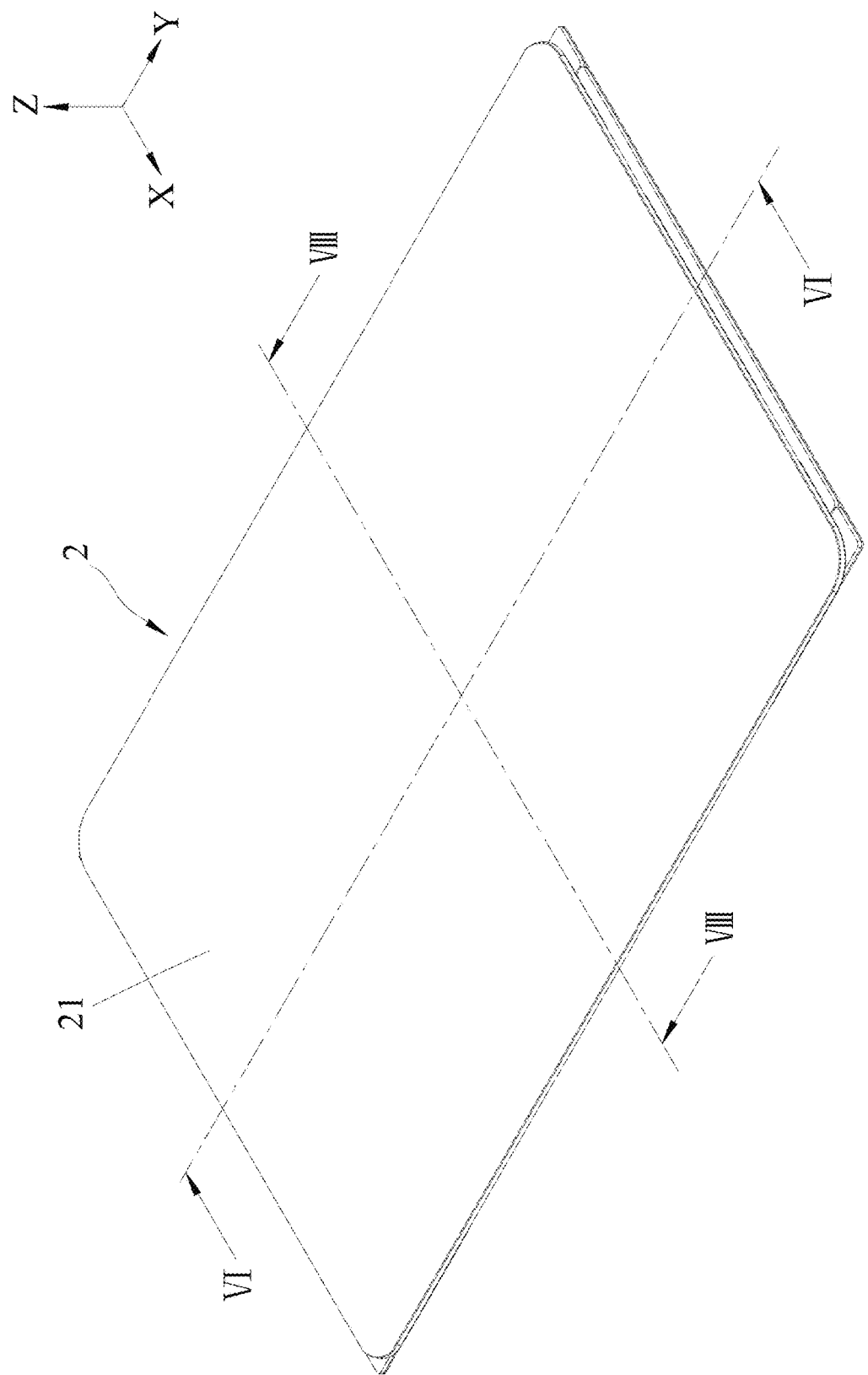
FIG. 1 is a top schematic perspective view illustrating a full-area touch device according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
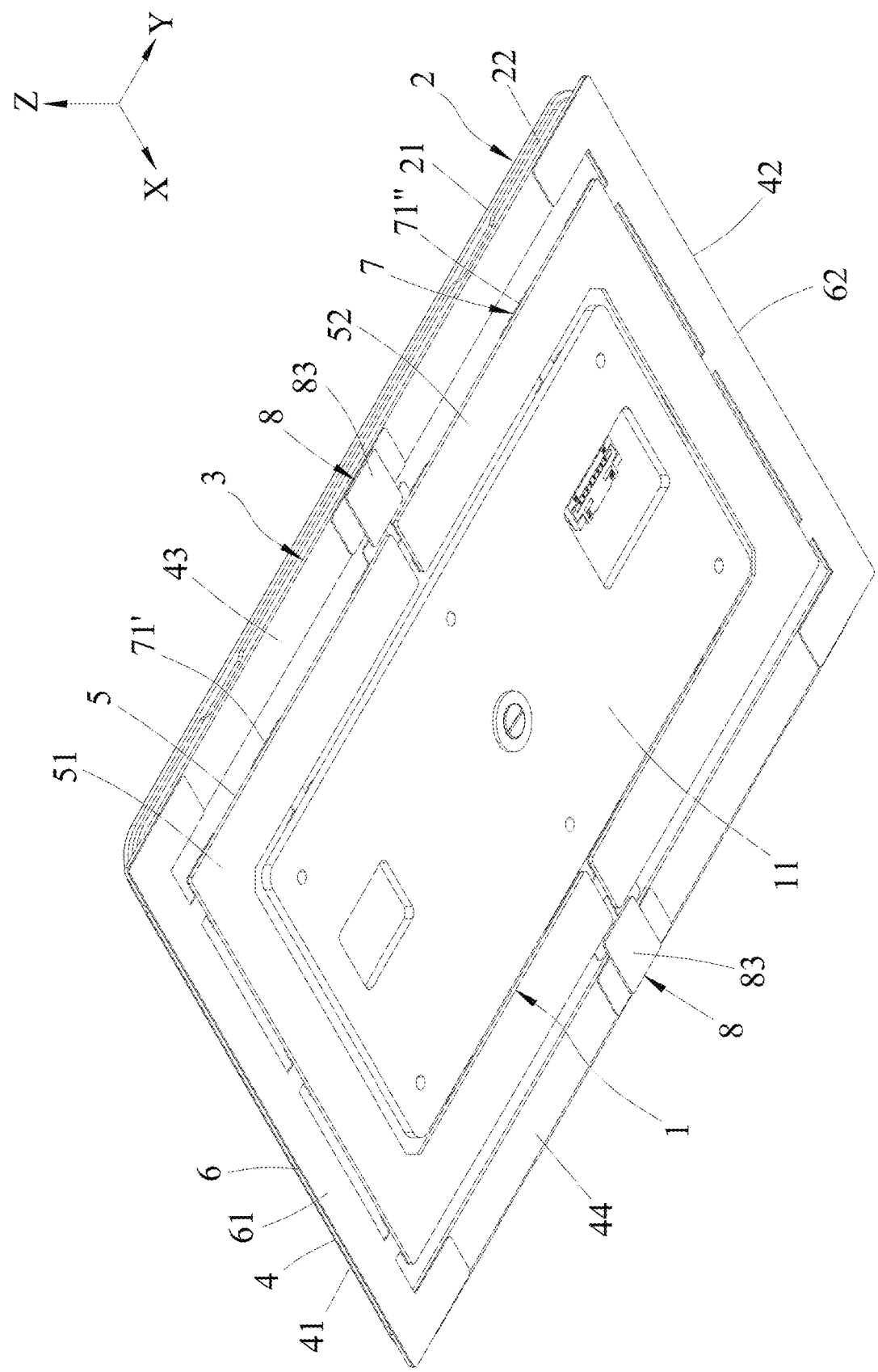
FIG. 2 is a bottom schematic perspective view of the embodiment.
Figure 3:
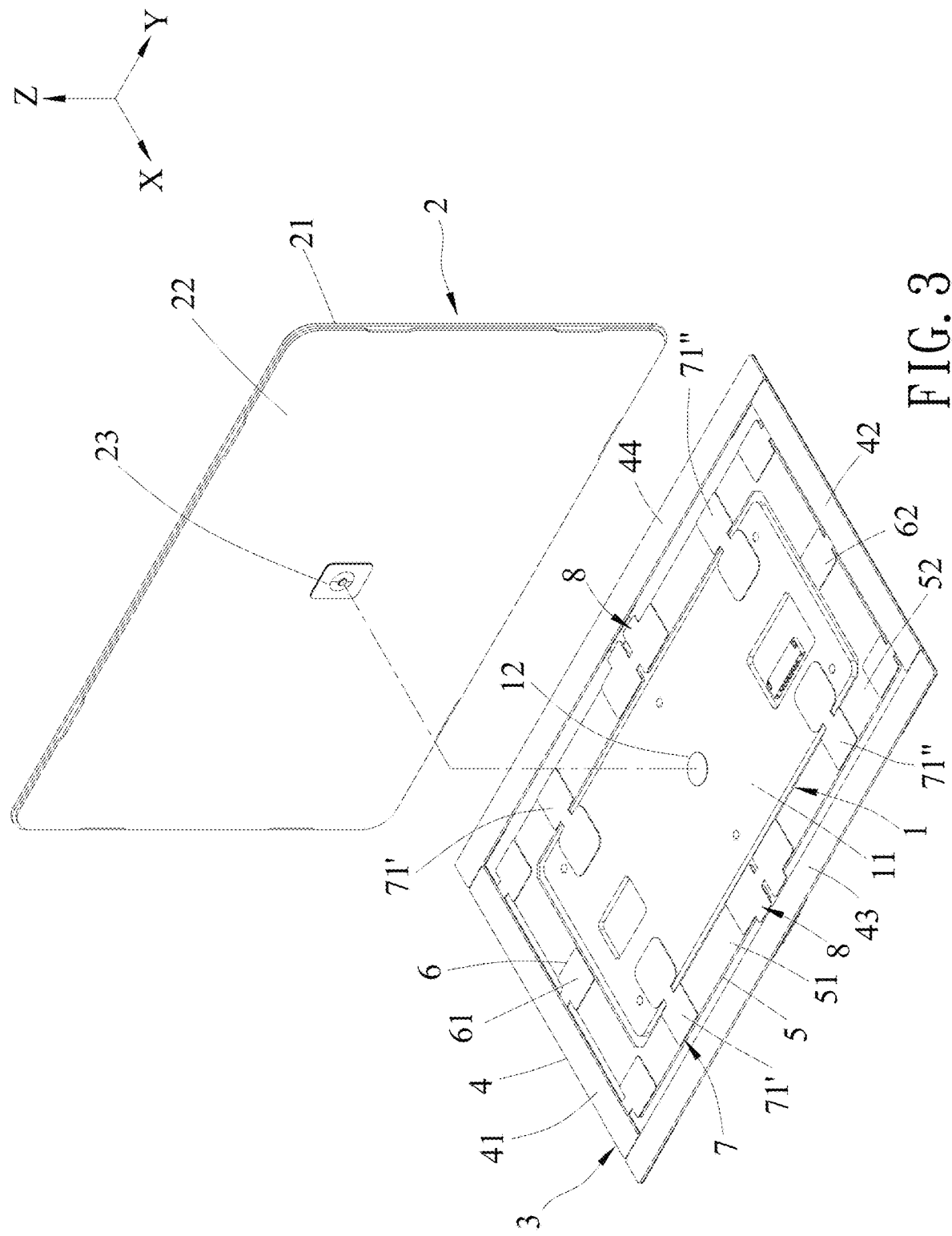
FIG. 3 is a partly exploded perspective view of the embodiment.

FIGS. 1 to 3 illustrate a full-area touch device according to an embodiment of the disclosure that is adapted to be mounted to a keyboard casing (not shown) of a laptop computer (not shown). The full-area touch device of the disclosure includes a base unit 1, a touch unit 2 disposed over the base unit 1, and a linkage unit 3 disposed between the base unit 1 and the touch unit 2.

The base unit 1 includes a base plate 11, and a trigger member 12 that is mounted on the base plate 11.

The touch unit 2 includes a touch plate 21, a circuit board 22, and a trigger switch 23. The circuit board 22 is disposed on a bottom surface of the touch plate 21 and has a bottom surface opposite to the touch plate 21. The trigger switch 23 is disposed on the bottom surface of the circuit board 22, is aligned with the trigger member 12, and is configured to be triggered by the trigger member 12.

Figure 4:
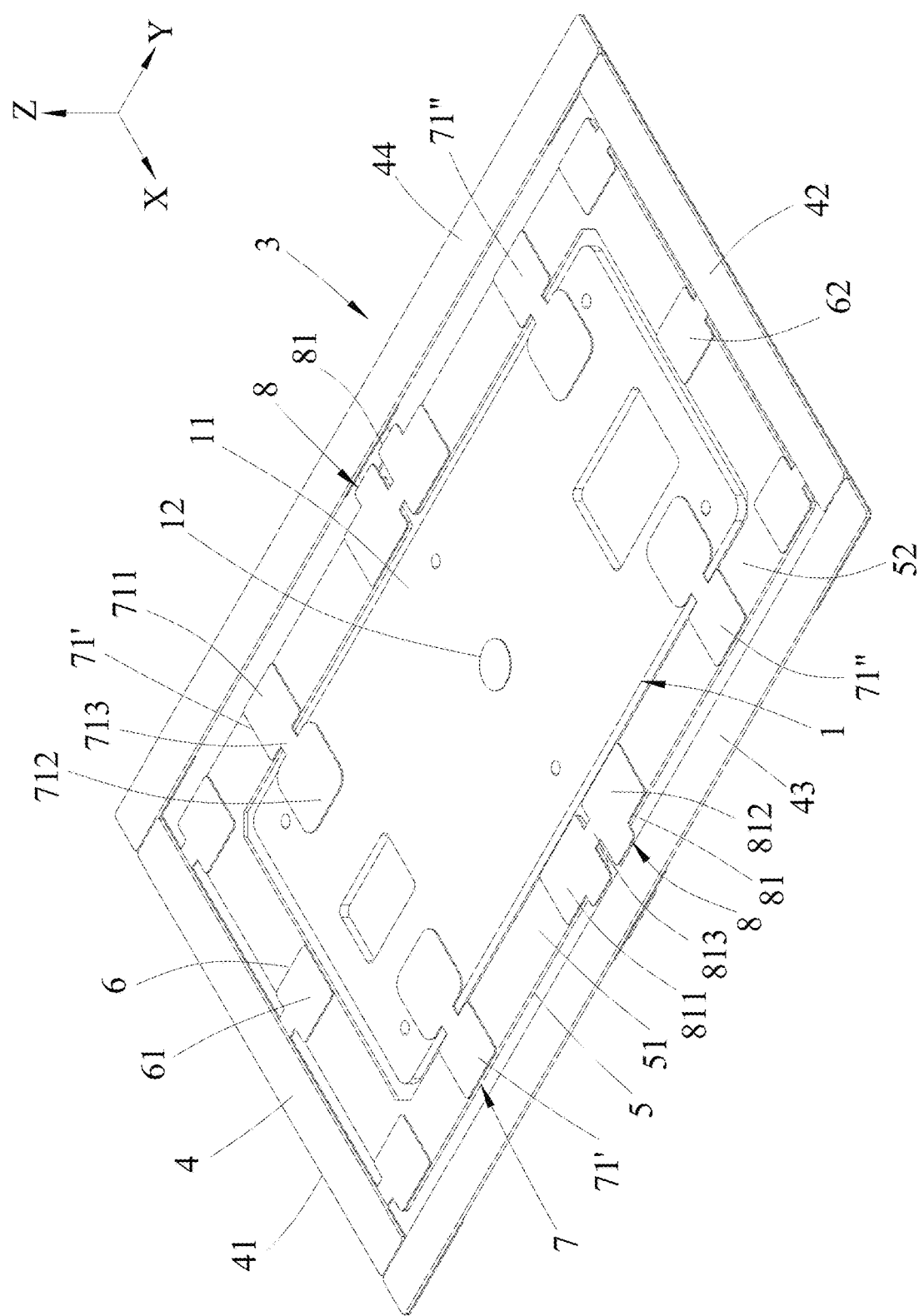
FIG. 4 is a fragmentary perspective view of the embodiment illustrating a base unit and a linkage unit of the full-area touch device while a touch unit of the full-area touch device is omitted.
Figure 5:
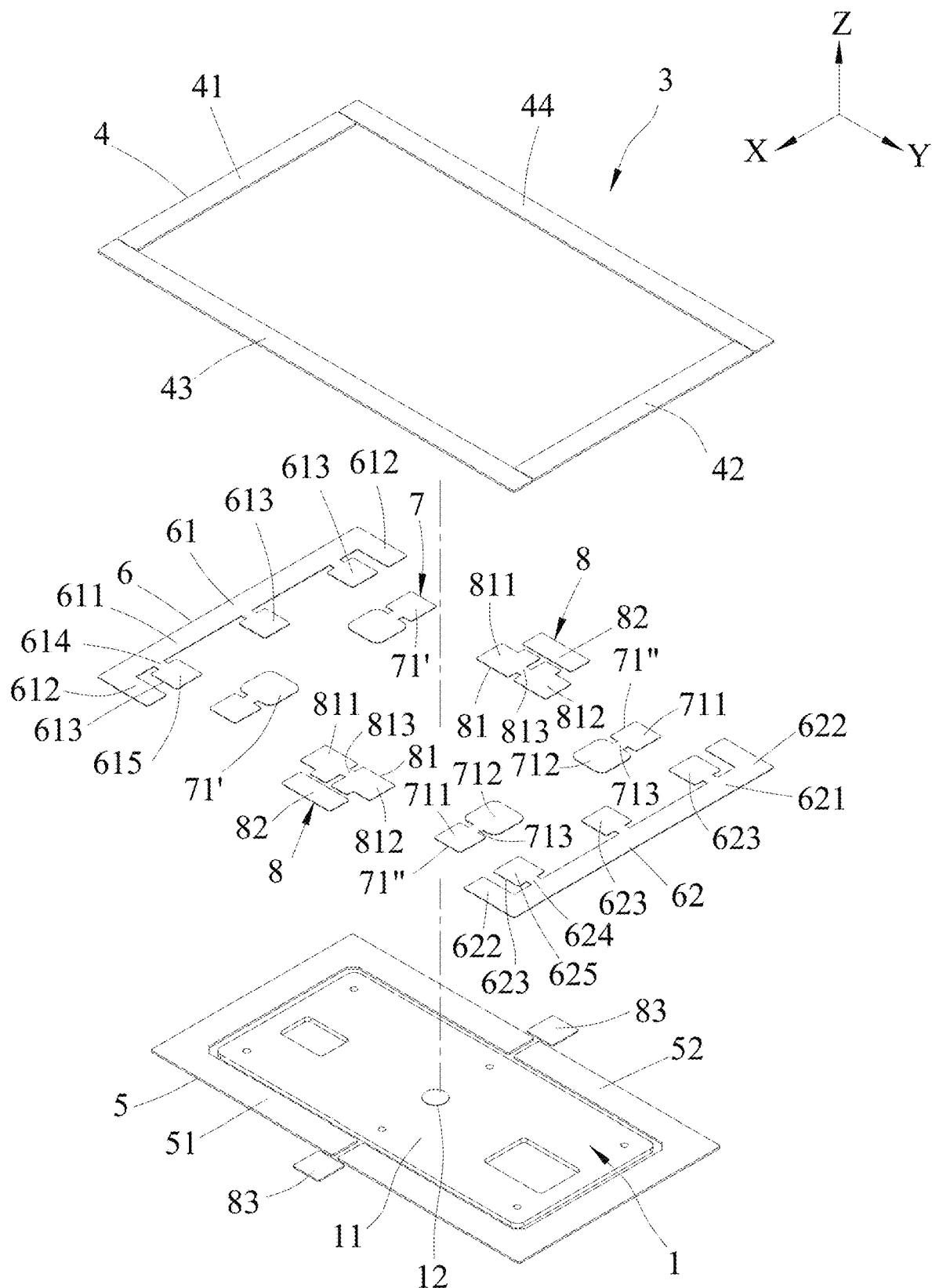
FIG. 5 is an fragmentary exploded perspective view of the embodiment illustrating an outer frame, an inner frame, a first linkage subunit, a second linkage subunit, and third linkage subunits of the linkage unit and the base unit.
Figure 6:
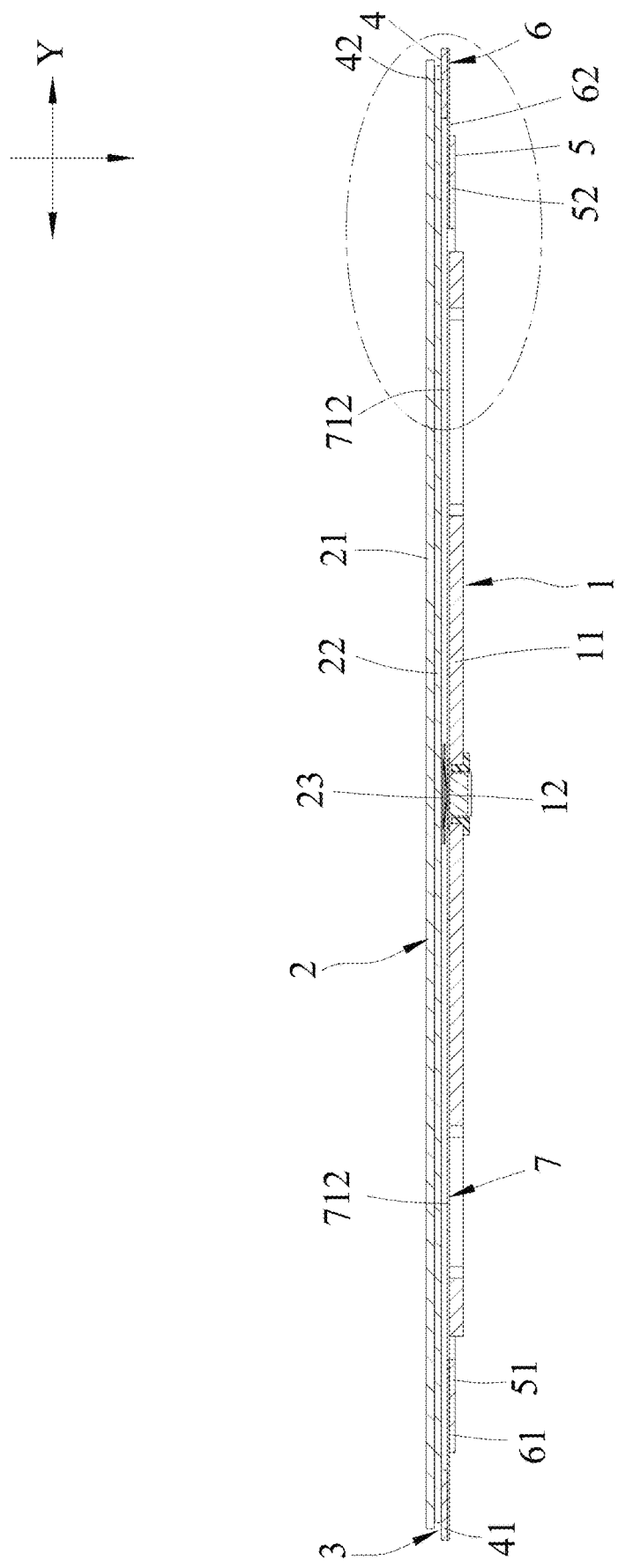
FIG. 6 is a schematic sectional view taken from line VI-VI of FIG. 1.

As shown in FIGS. 3 to 5, the linkage unit 3 is symmetrical with respect to the trigger switch 23 in a front-rear direction (X) and a left-right direction (Y) that is perpendicular to the front-rear direction (X). The linkage unit 3 includes an outer frame 4, an inner frame 5, a first linkage subunit 6, a second linkage subunit 7, and two third linkage subunits 8.

The outer frame 4 is fixedly connected to the bottom surface of the circuit board 22. The outer frame 4 is rectangular, and includes a left outer frame plate 41 and a right outer frame plate 42 that are spaced apart from each other, and a front outer frame plate 43 and a rear outer frame plate 44 that interconnect the left outer frame plate 41 and the right outer frame plate 42.

The inner frame 5 is surrounded by the outer frame 4, is disposed below the circuit board 22, is flexible, and includes a left inner frame plate 51 and a right inner frame plate 52 spaced apart from the left inner frame plate 51. The left inner frame plate 51 and the right inner frame plate 52 cooperatively surround the base plate 11. In this embodiment, each of the left inner frame plate 51 and the right inner frame plate 52 is formed in a U-shaped configuration.

The first linkage subunit 6 is fixedly connected to a bottom surface of the outer frame 4 and a top surface of the inner frame 5, and includes a left linkage plate 61 and a right linkage plate 62 spaced apart from the left linkage plate 61. The left linkage plate 61 and the right linkage plate 62 are flexible.

The left linkage plate 61 has a left main body portion 611, two left corner portions 612, and a plurality of left extension portions 613.

The left main body portion 611 is fixedly connected to a bottom surface of the left outer frame plate 41.

The left corner portions 612 are respectively connected to a front end and a rear end of the left main body portion 611, extend toward the right linkage plate 62, and are respectively and fixedly connected to a bottom surface of the front outer frame plate 43 and a bottom surface of the rear outer frame plate 44.

The left extension portions 613 extend from a right end of the left main body portion 611, are disposed between the left corner portions 612, and are fixedly connected to a top surface of the left inner frame plate 51. Each of the left extension portions 613 has a left narrow segment 614 and a left link segment 615. The left narrow segment 614 extends from the right end of the left main body portion 611 toward the right linkage plate 62. The left link segment 615 extends from a right end of the left narrow segment 614 toward the right linkage plate 62, and is fixedly connected to the top surface of the left inner frame plate 51. A length of the left narrow segment 614 in the front-rear direction (X) is smaller than a length of the left link segment 615 in the front-rear direction (X). In this embodiment, the left extension portions 613 are three in number. However, the number of the left extension portions 613 is not limited hereto, and may be two or more than three.

The right linkage plate 62 has a right main body portion 621, two right corner portions 622, and a plurality of right extension portions 623.

The right main body portion 621 is fixedly connected to a bottom surface of the right outer frame plate 42.

The two right corner portions 622 are respectively connected to a front end and a rear end of the right main body portion 621, extend toward the left linkage plate 61, and are respectively and fixedly connected to the bottom surface of the front outer frame plate 43 and the bottom surface of the rear outer frame plate 44.

The right extension portions 623 extend from a left end of the right main body portion 621, are disposed between the right corner portions 622, and are fixedly connected to a top surface of the right inner frame plate 52. Each of the right extension portions 623 has a right narrow segment 624 and a right link segment 625. The right narrow segment 624 extends from the left end of the right main body portion 621 toward the left linkage plate 61. The right link segment 625 extends from a left end of the right narrow segment 624 toward the left linkage plate 61, and is fixedly connected to the top surface of the right inner frame plate 52. A length of the right narrow segment 624 in the front-rear direction (X) is smaller than a length of the right link segment 625 in the front-rear direction (X). In this embodiment, the right extension portions 623 are three in number. However, the number of the right extension portions 623 is not limited hereto, and may be two or more than three.

The second linkage subunit 7 is fixedly connected to the top surface of the inner frame 5 and a top surface of the base plate 11. The second linkage subunit 7 includes a plurality of front-rear linkage members 71', 71" that are spaced apart from each other, that cooperatively surround the trigger member 12, and that are flexible. In this embodiment, the plurality of front-rear linkage members 71', 71" includes two left front-rear linkage members 71' and two right front-rear linkage members 71".

As shown in FIG. 5, the left front-rear linkage members 71' are spaced apart from each other in the front-rear direction (X) and are disposed adjacent to the left extension portions 613 of the left linkage plate 61, and the right front-rear linkage members 71" are spaced apart from each other in the front-rear direction (X) and are disposed adjacent to the right narrow segment 624 of the right linkage plate 62. Each of the left front-rear linkage members 71' and the right front-rear linkage members 71" has an outer link portion 711, an inner link portion 712, and a narrow portion 713. The outer link portion 711 is fixedly connected to the top surface of the inner frame 5. The inner link portion 712 is fixedly connected to the top surface of the base plate 11. The narrow portion 713 interconnects the outer link portion 711 and the inner link portion 712. A length of the narrow portion 713 in the left-right direction (Y) is smaller than a length of the outer link portion 711 in the left-right direction (Y) and a length of the inner link portion 712 in the left-right direction (Y).

Figure 8:
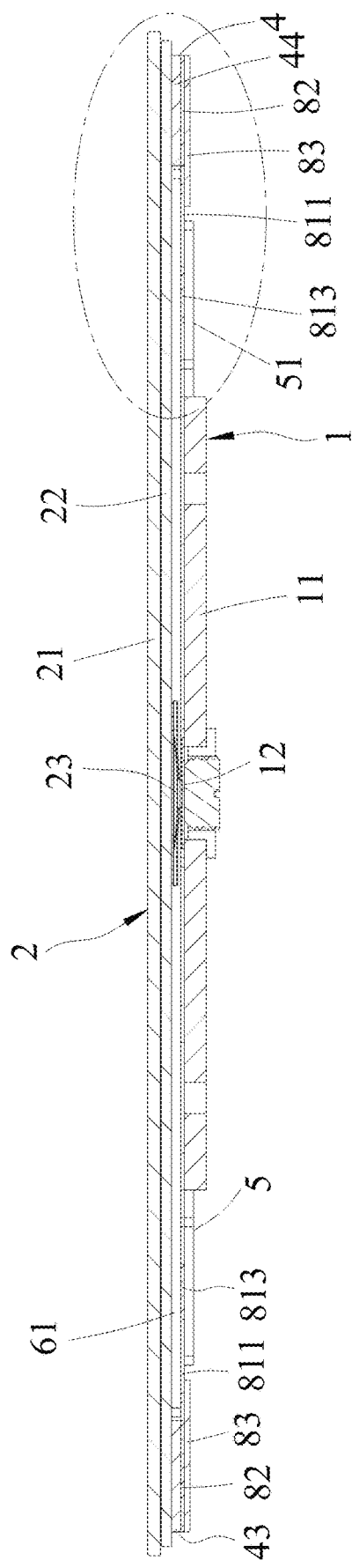
FIG. 8 is a schematic sectional view taken from line VIII-VIII of FIG. 1.
Figure 9:
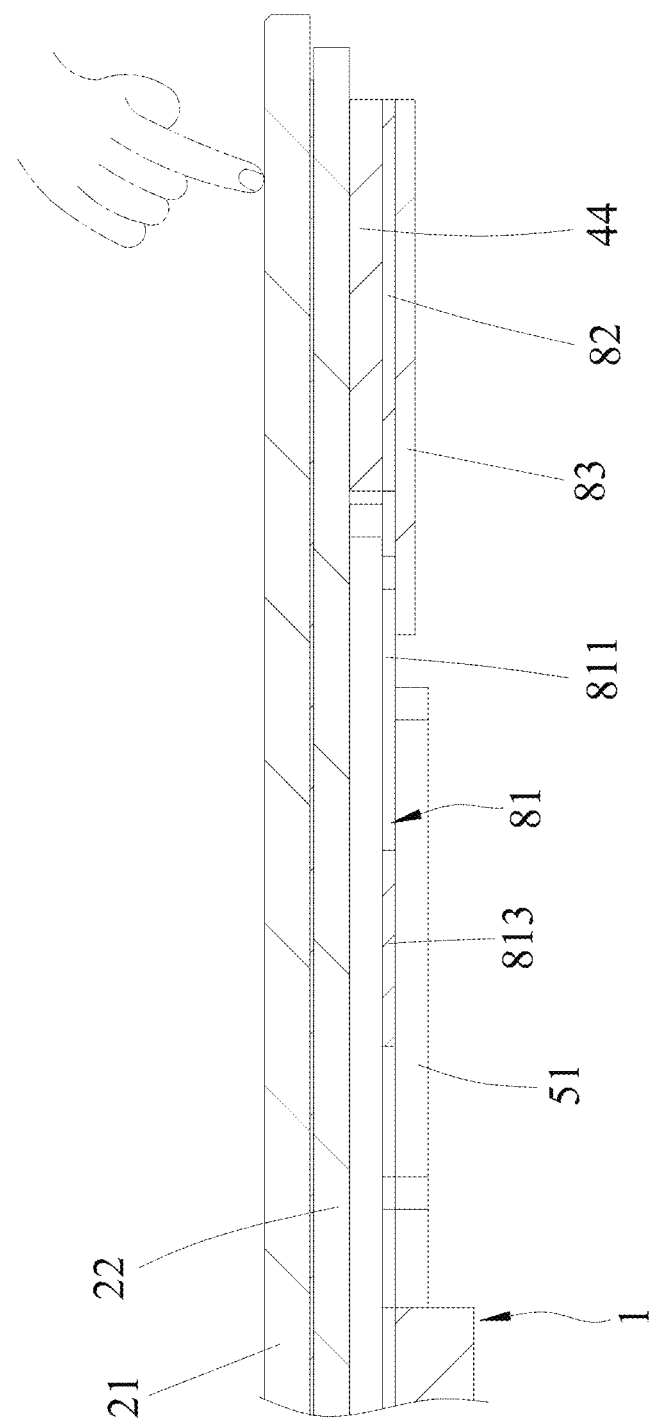
FIG. 9 is a fragmentary enlarged sectional view taken from an encircled region shown in FIG. 8.

The third linkage subunits 8 are spaced apart from each other in the front-rear direction (X). Each of the third linkage subunits 8 includes a left-right linkage member 81, a positioning member 82, and a spacer 83. The left-right linkage member 81 of each of the third linkage subunits 8 is flexible and is fixedly connected to the top surface of the left inner frame plate 51 and the top surface of the right inner frame plate 52. For each of the third linkage subunits 8, the spacer 83 is fixedly connected to a bottom surface of the positioning member 82 and abuts against a bottom surface of the left-right linkage member 81. As shown in FIGS. 8 and 9, the positioning member 82 of one of the third linkage subunits 8 is fixedly connected to the bottom surface of the front outer frame plate 43. The positioning member 82 of the other one of the third linkage subunits 8 is fixedly connected to the bottom surface of the rear outer frame plate 44. In this embodiment, for each of the third linkage subunits 8, a thickness of the positioning member 82 in a top-bottom direction (Z), which is perpendicular to the front-rear direction (X) and the left-right direction (Y), is substantially equal to a thickness of the left-right linkage member 81 in the top-bottom direction (Z).

Referring back to FIG. 5, the left-right linkage member 81 of each of the third linkage subunits 8 has a left link portion 811, a right link portion 812, and a neck portion 813. The left link portion 811 is fixedly connected to the top surface of the left inner frame plate 51. The right link portion 812 is fixedly connected to the top surface of the right inner frame plate 52. The neck portion 813 interconnects the left link portion 811 and the right link portion 812. A length of the neck portion 813 in the front-rear direction (X) is smaller than a length of the left link portion 811 in the front-rear direction (X) and a length of the right link portion 812 in the front-rear direction (X).

By virtue of the linkage unit 3 being disposed between the base unit 1 and the touch unit 2, the inner frame 5, the first linkage subunit 6, the second linkage subunit 7, the third linkage subunits 8, and the outer frame 4 cooperatively push the circuit board 22 away from the base plate 11.

After assembly of the full-area touch device of the disclosure is accomplished, when the full-area touch device is not applied by an external force, the inner frame 5, the first linkage subunit 6, the second linkage subunit 7, the third linkage subunits 8, and the outer frame 4 cooperatively push the circuit board 22 to a lifting position where the circuit board 22 is away from the base plate 11, such that the trigger switch 23 is in an untriggered state where the trigger switch 23 is away from the trigger member 12.

Operation and technical effects of the full-area touch device of the disclosure will be further described in details below.

Figure 7:
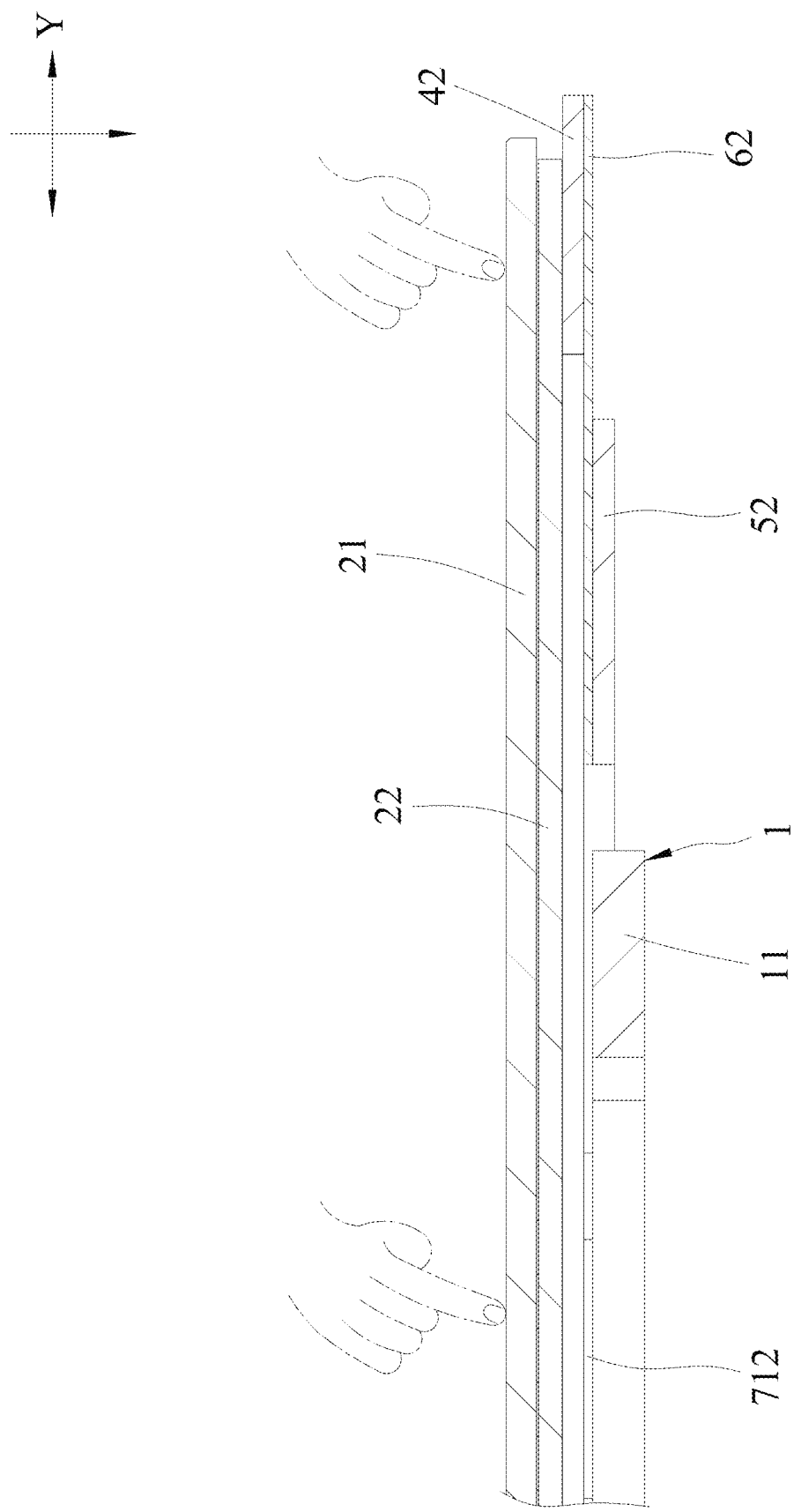
FIG. 7 is a fragmentary enlarged sectional view taken from an encircled region shown in FIG. 6.

Referring back to FIGS. 4 to 7, when a right side of the touch plate 21 is pressed (as shown in a right side of FIG. 7), the right outer frame plate 42 is driven to move downwardly. Because the first linkage subunit 6 is fixedly connected to the bottom surface of the outer frame 4 and the top surface of the inner frame 5, the right linkage plate 62 is driven by downward movement of the right outer frame plate 42 to move the right inner frame plate 52 downwardly such that the right inner frame plate 52 deforms. As shown in FIG. 4, the left-right linkage members 81 of the third linkage subunits 8 are spaced apart from each other in the front-rear direction (X). A front fulcrum may be formed by the left-right linkage member 81 that is adjacent to the front outer frame plate 43 and that is fixedly connected to the top surface of the left inner frame plate 51 and the top surface of the right inner frame plate 52. A rear fulcrum may be formed by the left-right linkage member 81 that is adjacent to the rear outer frame plate 44 and that is fixedly connected to the top surface of the left inner frame plate 51 and the top surface of the right inner frame plate 52. Downward movement of the right inner frame plate 52 is likely to move the left inner frame plate 51 upwardly with respect to the left-right linkage members 81 of the third linkage subunits 8. However, because the left-right linkage members 81 are flexible, torque applied to the left inner frame plate 51 may be reduced. In addition, a left front fixed point may be formed by the left front-rear linkage member 71' that is fixedly connected to the top surfaces of the left inner frame plate 51 and the base plate 11 and that is adjacent to the front outer frame plate 43. A left rear fixed point may be formed by the left front-rear linkage member 71' that is fixedly connected to the top surfaces of the left inner frame plate 51 and the base plate 11 and that is adjacent to the rear outer frame plate 44. The left front fixed point and the left rear fixed point formed by the left front-rear linkage members 71' may prevent the left inner frame plate 51 from moving upwardly and from driving a left side of the circuit board 22 to move upwardly, thereby reducing the touch unit 2 swaying in the left-right direction (Y). As the touch unit 2 moves downwardly, the circuit board 22 moves downwardly to a descending position opposite to the lifting position, and the trigger switch 23 is triggered by the trigger member 12 to generate a signal When the right side of the touch plate 21 is released from being pressed, the inner frame 5, the first linkage subunit 6, the second linkage subunit 7, and the third linkage subunits 8 flexibly return to an original state and cooperatively push the circuit board 22 away from the base plate 11 to the lifting position, such that the trigger switch 23 is converted from a trigger state to the untriggered state.

Because the linkage unit 3 is symmetrical with respect to the trigger switch 23 in the left-right direction (Y), pressing a left side of the touch plate 21 will result in the same effect and touch sense as pressing the right side of the touch plate 21 to move the circuit board 22 to the descending position. For brevity, details of the left side of the touch plate 21 being pressed and released will be omitted herein.

When a central region of the touch plate 21 is pressed (as shown in a left side of FIG. 7), the outer frame 4 is subjected to pressure and moves downwardly. Because the first linkage subunit 6 is fixedly connected to the bottom surface of the outer frame 4 and the top surface of the inner frame 5, the left linkage plate 61 and the right linkage plate 62 are driven by the downward movement of the outer frame 4 to cause the left inner frame plate 51 and the right inner frame plate 52 to move downwardly and deform, thereby allowing the touch unit 2 to move stably and downwardly. As the circuit board 22 moves to the descending position, the trigger switch 23 is triggered by the trigger member 12 and is converted from the untriggered state to the trigger state to generate a signal.

When the central region of the touch plate 21 is released from being pressed, the inner frame 5, the first linkage subunit 6, the second linkage subunit 7, and the third linkage subunits 8 flexibly return to the original state and cooperatively push the circuit board 22 to the lifting position, such that the trigger switch 23 is converted from the trigger state to the untriggered state.

Referring back to FIGS. 4, 5, 8, and 9, pressing a rear side of the touch plate 21 (see FIG. 9) results in the rear outer frame plate 44 moving downwardly. Because the first linkage subunit 6 is fixedly connected to the bottom surface of the outer frame 4 and the top surface of the inner frame 5, the rear sides of the left inner frame plate 51 and the right inner frame plate 52 are respectively driven by the left linkage plate 61 and the right linkage plate 62 to move downwardly in a deformed manner. As shown in FIG. 4, because the left rear fixed point may be formed by the left front-rear linkage member 71' that is fixedly connected to the top surfaces of the left inner frame plate 51 and the base plate 11 and that is adjacent to the rear outer frame plate 44, and because a right rear fixed point may be formed by the right front-rear linkage member 71" that is fixedly connected to the top surfaces of the right inner frame plate 52 and the base plate 11 and that is adjacent to the rear outer frame plate 44, the front sides of the left inner frame plate 51 and the right inner frame plate 52 are likely to move upwardly. However, because the left front fixed point may be formed by the left front-rear linkage member 71' that is fixedly connected to the top surfaces of the left inner frame plate 51 and the base plate 11 and that is adjacent to the front outer frame plate 43, and because a right front fixed point may be formed by the right front-rear linkage member 71" that is fixedly connected to the top surfaces of the right inner frame plate 52 and the base plate 11 and that is adjacent to the front outer frame plate 43, the left front fixed point formed by the left front-rear linkage member 71' and the right front fixed point formed by the right front-rear linkage member 71" respectively prevent the front sides of the left inner frame plate 51 and the right inner frame plate 52 from moving upwardly, thereby reducing the touch unit 2 swaying in the front-rear direction (X). As the circuit board 22 moves to the descending position, the trigger switch 23 is triggered by the trigger member 12 to generate a signal.

When the rear side of the touch plate 21 is released from being pressed, the inner frame 5, the first linkage subunit 6, the second linkage subunit 7, and the third linkage subunits 8 flexibly return to the original state and push the circuit board 22 away from the base plate 11 to the lifting position, such that the trigger switch 23 is converted from the trigger state to the untriggered state.

Because the linkage unit 3 is symmetrical with respect to the trigger switch 23 in the front-rear direction (X), pressing a front side of the touch plate 21 will result in the same effect and touch sense as pressing the rear side of the touch plate 21 to move the circuit board 22 to the descending position. For brevity, details of the front side of touch plate 21 being pressed and released will be omitted herein The full-area touch device of the disclosure has the following advantages.

1. By virtue of the first linkage subunit 6, the second linkage subunit 7, and the third linkage subunits 8 connecting the outer frame 4, the inner frame 5, and the base plate 11, when the touch plate 21 is pressed to cause the touch unit 2 to move downwardly toward the base plate 11, the touch unit 2 is unlikely to sway in the front-rear direction (X) or in the left-right direction (Y), thereby achieving a purpose and an effect of pressing any regions of a full area of the touch plate 21 to cause the trigger switch 23 to be triggered by the trigger member 12 of the base unit 10.
2. Because the linkage unit 3 is symmetrical with respect to the trigger switch 23 in the front-rear direction (X) and the left-right direction (Y), pressing the left side of the touch plate 21 results in the same touch sense as pressing the right side of the touch plate 21, and pressing the front side of the touch plate 21 results in the same touch sense as pressing the rear side of the touch plate 21, thereby increasing comfort during operation of the full-area touch device of the disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A full-area touch device comprising:
   a base unit including
      a base plate, and
      a trigger member that is mounted on said base plate;
   a touch unit disposed over said base unit, and including
      a touch plate,
      a circuit board that is disposed on a bottom surface of said touch plate and that has a bottom surface opposite to said touch plate, and
      a trigger switch that is disposed on said bottom surface of said circuit board, that is aligned with said trigger member, and that is configured to be triggered by said trigger member; and
   a linkage unit disposed between said base unit and said touch unit, symmetrical with respect to said trigger switch in a front-rear direction and a left-right direction that is perpendicular to the front-rear direction, and including
      an outer frame that is fixedly connected to said bottom surface of said circuit board,
      an inner frame that is surrounded by said outer frame, that is disposed below said circuit board, that is flexible, and that includes a left inner frame plate and a right inner frame plate spaced apart from said left inner frame plate, said left inner frame plate and said right inner frame plate cooperatively surrounding said base plate,
      a first linkage subunit that is fixedly connected to a bottom surface of said outer frame and a top surface of said inner frame, and that includes a left linkage plate and a right linkage plate spaced apart from said left linkage plate, said left linkage plate and said right linkage plate being flexible,
      a second linkage subunit that is fixedly connected to said top surface of said inner frame and a top surface of said base plate, and that includes a plurality of front-rear linkage members spaced apart from each other, cooperatively surrounding said trigger member, and flexible, and
      two third linkage subunits, each of said third linkage subunits including a left-right linkage member that is flexible and that is fixedly connected to a top surface of said left inner frame plate and a top surface of said right inner frame plate;

wherein said inner frame, said first linkage subunit, said second linkage subunit, said third linkage subunits, and said outer frame cooperatively push said circuit board away from said base plate.

2. The full-area touch device as claimed in claim 1, wherein:

said outer frame is rectangular and includes
a left outer frame plate and a right outer frame plate that are spaced apart from each other, and
a front outer frame plate and a rear outer frame plate that interconnect said left outer frame plate and said right outer frame plate;

said left linkage plate has
a left main body portion that is fixedly connected to a bottom surface of said left outer frame plate, and
two left corner portions that are respectively connected to a front end and a rear end of said left main body portion, that extend toward said right linkage plate, and that are respectively and fixedly connected to a bottom surface of said front outer frame plate and a bottom surface of said rear outer frame plate; and said right linkage plate has
a right main body portion that is fixedly connected to a bottom surface of said right outer frame plate, and
two right corner portions that are respectively connected to a front end and a rear end of said right main body portion, that extend toward said left linkage plate, and that are respectively and fixedly connected to said bottom surface of said front outer frame plate and said bottom surface of said rear outer frame plate.

3. The full-area touch device as claimed in claim 2, wherein:

said left linkage plate further has a plurality of left extension portions that extend from a right end of said left main body portion, that are disposed between said left corner portions, and that are fixedly connected to said top surface of said left inner frame plate; and said right linkage plate further has a plurality of right extension portions that extend from a left end of said right main body portion, that are disposed between said right corner portions, and that are fixedly connected to said top surface of said right inner frame plate.

4. The full-area touch device as claimed in claim 3, wherein:

each of said left extension portions has
a left narrow segment that extends from said right end of said left main body portion toward said right linkage plate, and
a left link segment that extends from a right end of said left narrow segment toward said right linkage plate, and that is fixedly connected to said top surface of said left inner frame plate, a length of said left narrow segment in the front-rear direction being smaller than a length of said left link segment in the front-rear direction; and each of said right extension portions has
a right narrow segment that extends from said left end of said right main body portion toward said left linkage plate, and
a right link segment that extends from a left end of said right narrow segment toward said left linkage plate, and that is fixedly connected to said top surface of said right inner frame plate, a length of said right narrow segment in the front-rear direction being smaller than a length of said right link segment in the front-rear direction.

5. The full-area touch device as claimed in claim 2, wherein said left-right linkage member of each of said third linkage subunits has:

a left link portion that is fixedly connected to said top surface of said left inner frame plate;
a right link portion that is fixedly connected to said top surface of said right inner frame plate; and
a neck portion that interconnects said left link portion and said right link portion, a length of said neck portion in the front-rear direction being smaller than a length of said left link portion in the front-rear direction and a length of said right link portion in the front-rear direction.

6. The full-area touch device as claimed in claim 5, wherein:

each of said third linkage subunits further includes
a positioning member, and
a spacer that is fixedly connected to a bottom surface of said positioning member and that abuts against a bottom surface of said left-right linkage member;
said positioning member of one of said third linkage subunits is fixedly connected to said bottom surface of said front outer frame plate; and
said positioning member of the other one of said third linkage subunits is fixedly connected to said bottom surface of said rear outer frame plate.

7. The full-area touch device as claimed in claim 6, wherein for each of said third linkage subunits, a thickness of said positioning member in a top-bottom direction, which is perpendicular to the front-rear direction and the left-right direction, is substantially equal to a thickness of said left-right linkage member in the top-bottom direction.

8. The full-area touch device as claimed in claim 1, wherein:

said plurality of front-rear linkage members includes two left front-rear linkage members and two right front-rear linkage members; and each of said left front-rear linkage members and said right front-rear linkage members has
an outer link portion that is fixedly connected to said top surface of said inner frame,
an inner link portion that is fixedly connected to said top surface of said base plate, and
a narrow portion that interconnects said outer link portion and said inner link portion, a length of said narrow portion in the left-right direction being smaller than a length of said outer link portion in the left-right direction and a length of said inner link portion in the left-right direction.

* * * * *